(12) United States Patent
LeBlanc, Sr. et al.

(10) Patent No.: US 7,798,506 B2
(45) Date of Patent: Sep. 21, 2010

(54) WHEEL SUSPENSION SYSTEM FOR VEHICLES

(75) Inventors: James C. LeBlanc, Sr., Rochester, MI (US); James C. LeBlanc, Jr., Washington, MI (US); Paul D. Bentley, Rochester, MI (US); Michael G. Budgery, Waterford, MI (US)

(73) Assignee: GPV, L.L.C., Southfield, MI (US)

( * ) Notice: Subject to any disclaimer, the term of this patent is extended or adjusted under 35 U.S.C. 154(b) by 748 days.

(21) Appl. No.: 10/969,912

(22) Filed: Oct. 22, 2004

(65) Prior Publication Data

US 2005/0110235 A1    May 26, 2005

Related U.S. Application Data

(63) Continuation-in-part of application No. PCT/US03/31228, filed on Oct. 3, 2003.

(51) Int. Cl.
*B60G 3/18* (2006.01)
(52) U.S. Cl. .......................... 280/124.135; 280/124.145
(58) Field of Classification Search .......... 280/124.145, 280/93.512, 124.134, 124.135
See application file for complete search history.

(56) References Cited

U.S. PATENT DOCUMENTS

| | | | | |
|---|---|---|---|---|
| 3,057,640 A | * | 10/1962 | Soer .................... | 280/124.142 |
| 3,161,251 A | * | 12/1964 | Kraus .................... | 180/295 |
| 3,362,498 A | * | 1/1968 | Allison .................... | 180/360 |
| 4,377,298 A | * | 3/1983 | Finn et al. .................... | 280/124.142 |
| 4,786,115 A | * | 11/1988 | Ashberg .................... | 301/124.1 |
| 4,844,505 A | * | 7/1989 | Higuchi .................... | 280/124.145 |
| 4,915,513 A | * | 4/1990 | Orain .................... | 384/447 |
| 4,986,565 A | | 1/1991 | Hajto | |
| 4,995,633 A | * | 2/1991 | Santo .................... | 280/124.146 |
| 5,022,673 A | * | 6/1991 | Sekino et al. .......... | 280/124.138 |
| 5,353,890 A | * | 10/1994 | Clohessy .................... | 180/247 |
| 5,374,076 A | * | 12/1994 | Lee .................... | 280/124.143 |
| 5,558,361 A | * | 9/1996 | Shin .................... | 280/124.15 |
| 5,868,410 A | * | 2/1999 | Kawabe et al. .......... | 280/124.15 |
| 5,873,587 A | * | 2/1999 | Kawabe et al. ........ | 280/124.135 |

(Continued)

FOREIGN PATENT DOCUMENTS

DE     3843614 A1    7/1990

(Continued)

*Primary Examiner*—Paul N Dickson
*Assistant Examiner*—Timothy D Wilhelm
(74) *Attorney, Agent, or Firm*—Novak Druce + Quigg LLP

(57) ABSTRACT

A wheel suspension system for a vehicle having a body supported on a set of wheels each provided with a rim and an axle generally consisting of a lower control arm pivotally connectable to a first portion of such body; an upper control arm pivotally connectable to a second portion of such body; a roller bearing having inner and outer races, disposed within such rim, coaxially relative to the rotational axis of the rim; a steering plate mounted on the outer race of the bearing, having a first portion universally connected to the lower control arm and a second portion universally connected to the upper control arm, defining a steering axis intersecting the rotational axis of the rim; and a hub member mounted on the inner race and connectable to an axle receivable through an opening provided in the steering plate.

18 Claims, 9 Drawing Sheets

U.S. PATENT DOCUMENTS

| | | | |
|---|---|---|---|
| 6,027,130 A * | 2/2000 | Kawabe et al. | 280/124.135 |
| 6,062,580 A * | 5/2000 | Kawabe et al. | 280/124.145 |
| 6,116,626 A * | 9/2000 | Cherry et al. | 280/124.135 |
| 6,170,628 B1 * | 1/2001 | Bigley | 192/69.41 |
| 6,296,264 B1 * | 10/2001 | Wimmer | 280/124.134 |
| 6,390,221 B2 * | 5/2002 | Goddard et al. | 180/247 |
| 6,398,262 B1 * | 6/2002 | Ziech et al. | 280/785 |
| 6,568,697 B1 * | 5/2003 | Ledesma et al. | 280/93.512 |
| 6,585,276 B2 * | 7/2003 | Boucquey | 280/124.135 |
| 6,676,145 B2 * | 1/2004 | Carlstedt et al. | 280/124.146 |
| 6,729,633 B1 * | 5/2004 | Irwin | 280/86.75 |
| 6,764,084 B1 * | 7/2004 | Nakamura et al. | 280/93.512 |
| 6,783,137 B2 * | 8/2004 | Nagreski et al. | 280/93.512 |
| 6,789,812 B2 * | 9/2004 | Peterson | 280/124.152 |
| 6,811,003 B2 * | 11/2004 | Novak | 188/72.1 |
| 6,866,295 B2 * | 3/2005 | Ziech et al. | 280/785 |
| 6,997,468 B2 * | 2/2006 | Ziech et al. | 280/93.512 |
| 7,055,667 B2 * | 6/2006 | Roe et al. | 192/69.41 |
| 7,152,866 B2 * | 12/2006 | Chalin et al. | 280/86.5 |
| 2002/0020982 A1 * | 2/2002 | Boucquey | 280/124.135 |
| 2002/0113394 A1 * | 8/2002 | Ziech et al. | 280/124.109 |
| 2003/0159894 A1 * | 8/2003 | Novak | 188/72.1 |
| 2004/0227320 A1 * | 11/2004 | Platner et al. | 280/124.135 |
| 2005/0104312 A1 * | 5/2005 | Durand | 280/93.512 |
| 2005/0200094 A1 * | 9/2005 | Hozumi | 280/124.135 |
| 2005/0247502 A1 * | 11/2005 | Ziech et al. | 180/253 |
| 2006/0186627 A1 * | 8/2006 | Koyagi et al. | 280/93.512 |
| 2006/0290088 A1 * | 12/2006 | Luttinen et al. | 280/93.51 |

FOREIGN PATENT DOCUMENTS

| | | |
|---|---|---|
| FR | 2745237 | 8/1997 |
| JP | 872517 | 3/1996 |
| JP | 2006160198 | 6/2006 |

* cited by examiner

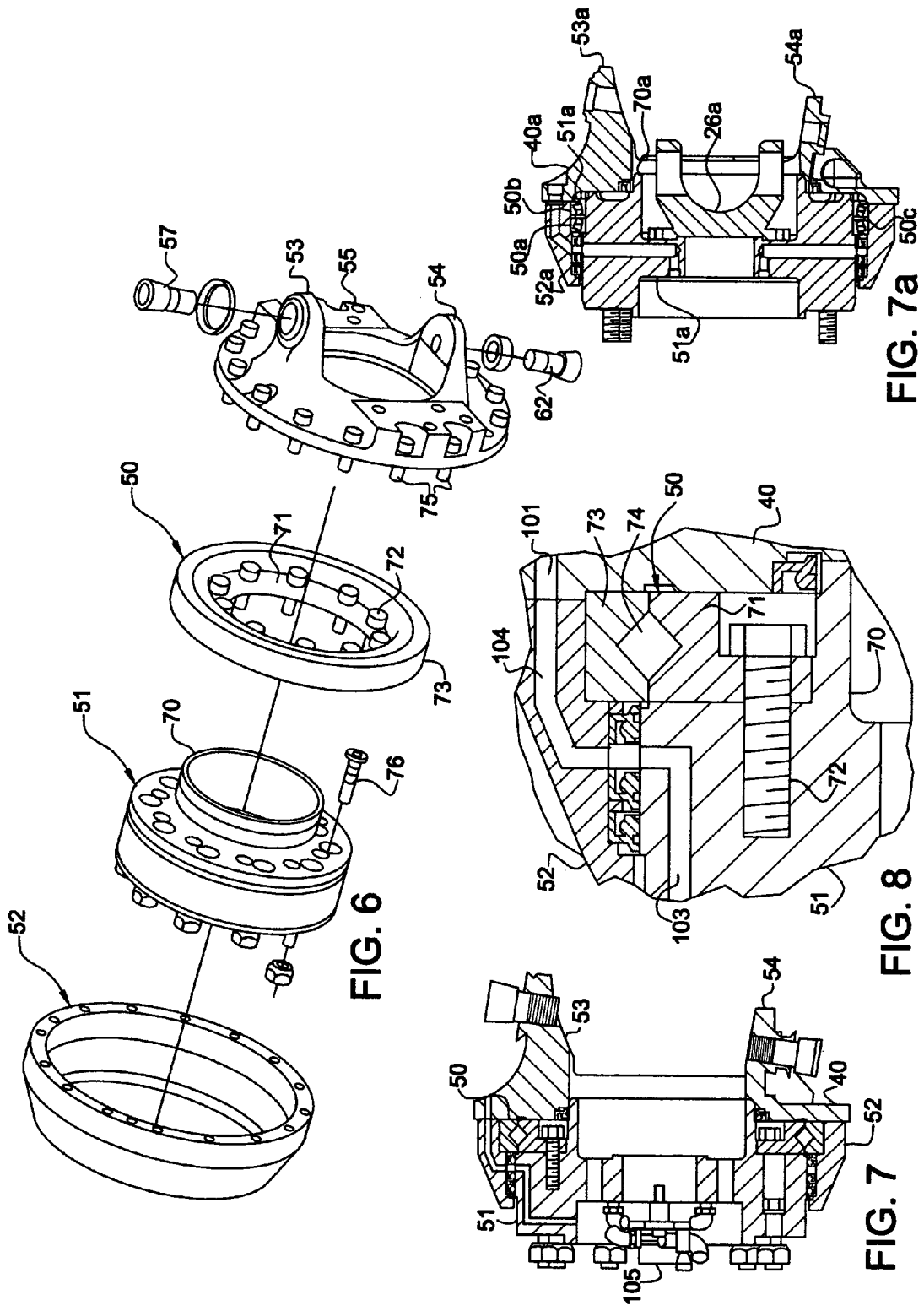

WHEEL SUSPENSION SYSTEM FOR VEHICLES

This invention relates to an automotive vehicle and more particularly to a novel wheel unit for such a vehicle. The invention further contemplates a novel wheel suspension system forming a component of such unit. This application is a continuation-in-part of PCT Application No. PCT/US03/31228 filed Oct. 3, 2003, which is incorporated herein by reference.

BACKGROUND OF THE INVENTION

In the prior art, there has been developed a certain type of vehicle designed for a variety of purposes, generally consisting of a body mounted on a set of wheel units, a power plant mounted in the vehicle body, a drivetrain for transmitting drive from the power plant to the wheel units, a steering system operatively connected to one or more of the wheel units and, often, various auxiliary systems. Because such vehicles are intended to carry an operator, often additional personnel and/or cargo or additional equipment, it is desirable that the compartment space of such vehicles be as large as possible. The mounting and installation of such required units and systems, however, has the effect of intruding upon and thus diminishing the compartment space of such vehicles.

In addition to requiring maximum compartment space, it is desirable that such vehicles be effectively mobile and maneuverable in operation. They must be capable of operating on both ordinary roadways and offroad terrain. They further must be capable of being operated on irregular and sloped terrain and to do so by maintaining as near a level bearing of the vehicle body as possible in order to maintain vehicle control and operate the various systems of the vehicle.

In view of the foregoing requirements of such vehicle, it is the principal object of the present invention to provide a wheel unit for the type of vehicle described which provides all wheel drive for such vehicles, maximum jounce and rebound for negotiating irregular and sloped terrain and minimal intrusion upon the body of the vehicle in order to provide maximum compartment space.

SUMMARY OF THE INVENTION

The present invention achieves its principal objective by providing a wheel unit generally consisting of a wheel including rim and disc portions, upper and lower control arms universally connected to the body of the vehicle, a knuckle plate universally connected to the outer ends of the upper and lower control arms, a roller bearing disposed within the rim portion of the wheel coaxially therewith having an outer race mounted on the knuckle plate and an inner race, a hub member mounted on the inner race of the bearing and rigidly connected to the disc portion of the wheel and a half shaft operatively connected at an inner end to a component of the vehicle drivetrain and an outer end extending through the bearing and connected to the hub member for rotational drive therewith. The bearing is adapted to carry axial, radial and moment loads. The outer end of the half shaft is provided with a pair of Cardan or universal joints disposed within the rim portion of the wheel, and the kingpin axis of the knuckle plate intersects a midpoint of the Cardan joints of the half shaft and includes a portion disposed within the rim portion of the wheel. A strut is pivotally connected to the upper control arm, having a support platform. Such strut further is supported by a pair of links, a lower set of ends of which are pivotally connected to the lower control arm and an upper set of ends of which are pivotally connected to the support platform to provide a substantially horizontal seating surface when the unit is in a full jounce condition. Seated on the support platform is an air spring having the upper end thereof secured to a portion of the vehicle body. With such a configuration, the wheel is capable of increased jounce and rebound with correspondingly minimal angularity of the half axle, and may be steered through a minimal steering angle to provide a minimal turning angle without unduly intruding upon the body of the vehicle and thus providing a maximum compartment space for the vehicle.

BRIEF DESCRIPTION OF THE DRAWINGS

FIG. 6 is an exploded view of the axle end assembly utilized in the wheel unit shown in FIGS. 1 through 5;

FIG. 7 is a vertical cross-sectional view of the assembly shown in FIG. 6, assembled;

FIG. 7a is a view similar to the view shown in FIG. 7, illustrating another embodiment of the axle end assembly;

FIG. 8 is an enlarged, fragmentary view of a portion of the assembly shown in FIG. 7;

DETAILED DESCRIPTIONS OF EMBODIMENTS OF THE INVENTION

Figure 1:
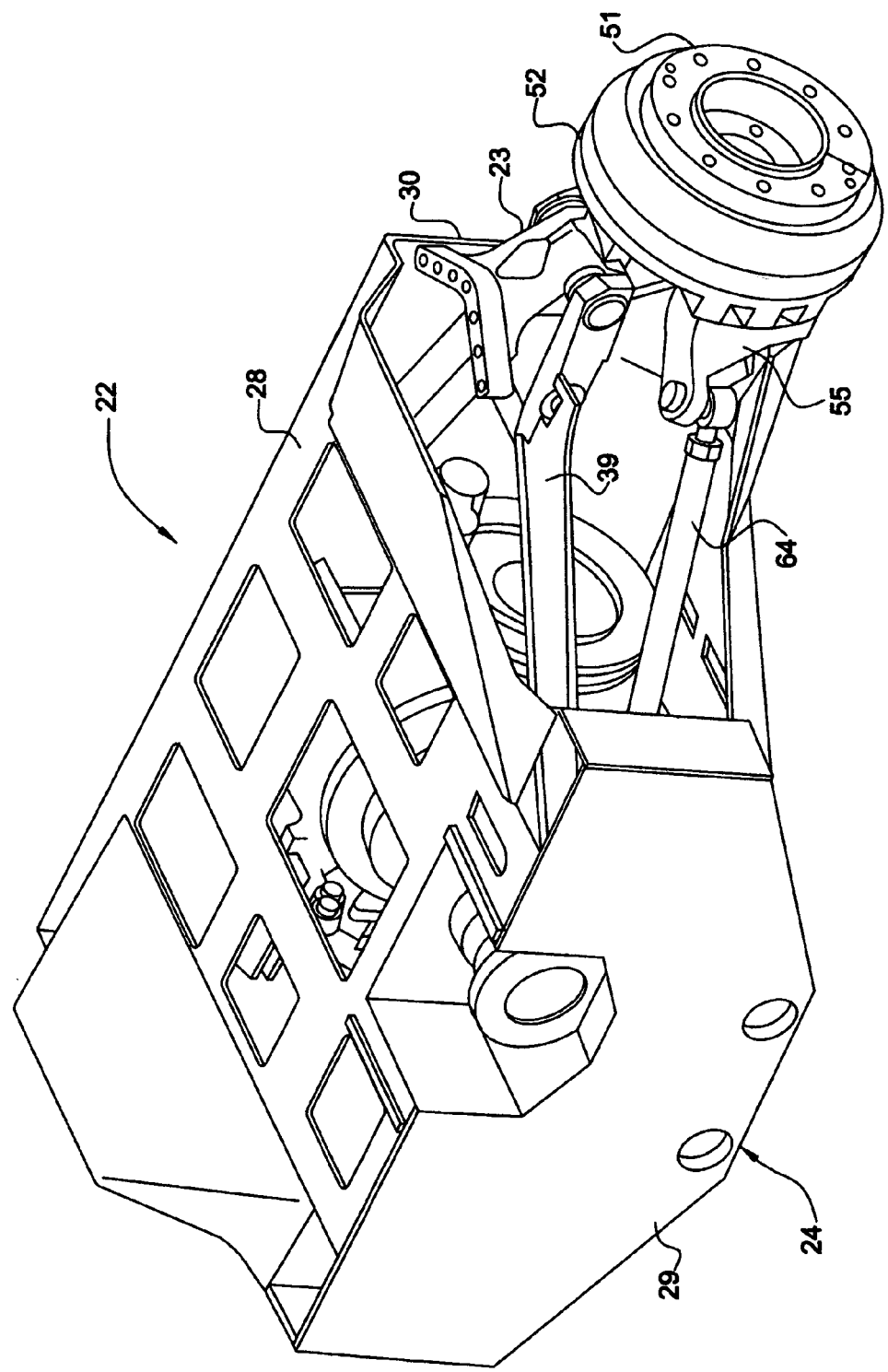
FIG. 1 is a perspective view of a wheel unit, having certain portions thereof removed.
Figure 2:
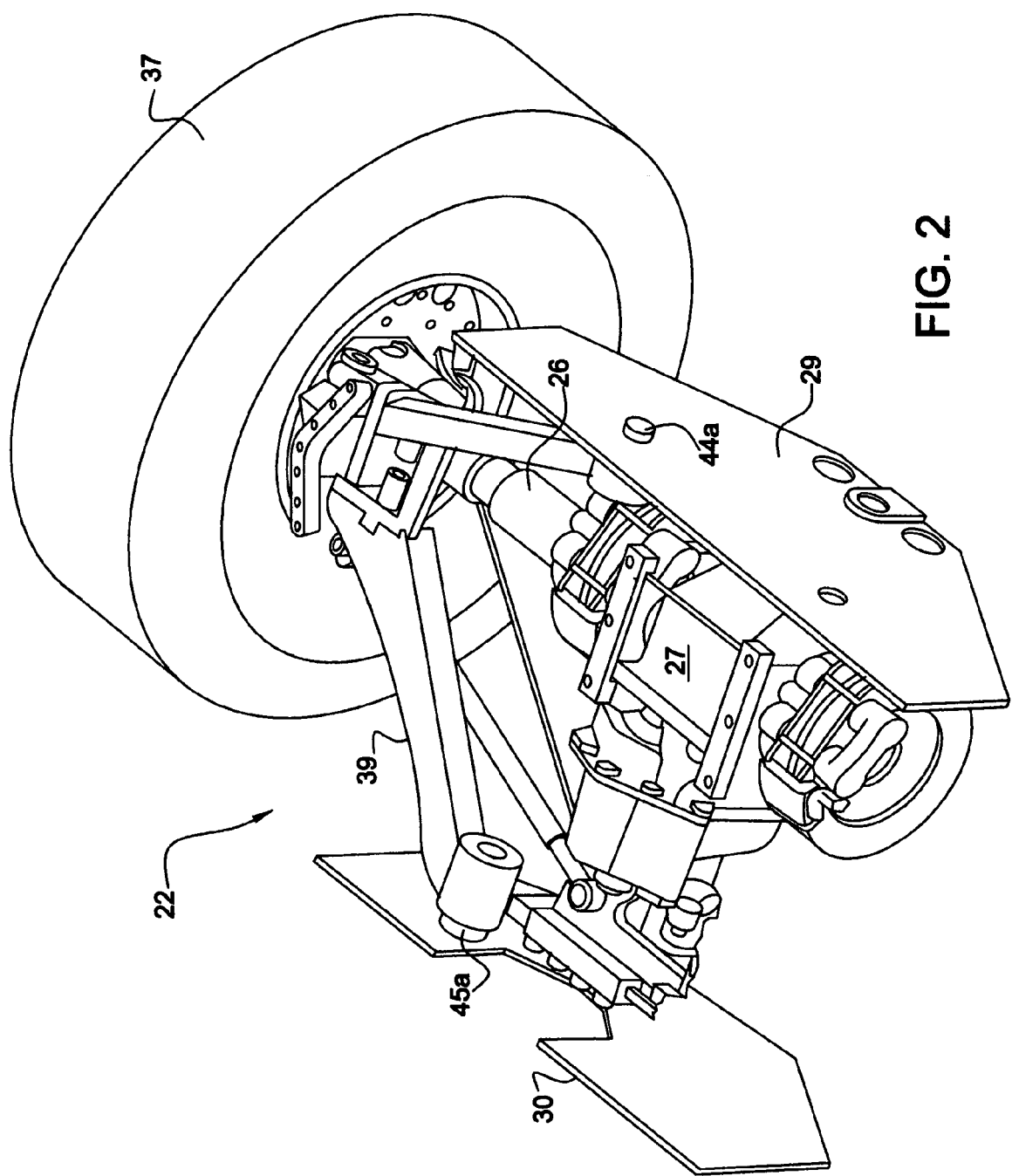
FIG. 2 is a perspective view of a portion of the wheel unit shown in FIG. 1, having portions of the support housing and the suspension system removed.

The present invention relates to an automotive vehicle generally consisting of a body mounted on a set of wheel units 22, a power plant mounted within the body, a drivetrain for transmitting drive from the power plant to the wheel units, a steering system mounted on the body and operatively connected to one or more of the wheel units and various other auxiliary equipment and systems. The vehicle may have a 4×4 configuration with a one or both axles being steerable, a 6×6 configuration with the front and rear wheel units being steerable, an 8×8 configuration with one or all of the wheel units being steerable or a 10×10 configuration with one or all but the middle wheel units being steerable.

Referring to FIGS. 1 through 9, there is illustrated a wheel unit 22 generally including a suspension system 23 supported on a section 24 of the vehicle body, a wheel assembly 25 supported on the suspension system and a half axle 26 drivingly interconnecting an output shaft of a carrier 27 of the vehicle drivetrain and the wheel assembly. Body section 24 includes an upper wall member 28, a pair of longitudinally spaced, transversely disposed wall members 29 and 30 forming a transverse recess in the bottom of the hull, communicating at the ends thereof with wheel wells of the body. The lateral ends of the upper wall member 28 are angled upwardly to accommodate the angular displacement of the half shafts of the wheel units as will later be described. Carrier 27 is disposed in the bottom wall recess, on the longitudinal centerline of the vehicle, and depends from and is bolted to the upper wall member 28. It includes a conventional or locking differential, a longitudinal disposed input shaft drivingly connected to the drivetrain of the vehicle, possibly an output shaft aligned with the input shaft depending upon the actual position of the unit within the vehicle and a pair of laterally projecting output shafts. In a vehicle configuration in which the wheel units are the foremost wheel units, the carrier will include only a rearwardly disposed input shaft connected to the drivetrain of the vehicle. In a configuration where the wheel units are the rearward most units of the vehicle, the carrier will have a front input shaft. In configurations where the wheel units are intermediate units, the carrier will include both longitudinally aligned input and output shafts. In the units illustrated, the carrier includes an input shaft, a longitudinally aligned output shaft and a pair of laterally projecting output shafts.

Wheel assembly 25 is of a conventional construction including a wheel 34 having a rim portion 35 and a disc portion 36. A tire 37 is mounted on the rim portion of the wheel in the conventional manner. Half axle 26 is operatively connected at an inner end thereof to an output shaft of the carrier and is drivingly connected to the wheel unit in a manner as will be later described.

Suspension system 23 includes a lower control arm 38, an upper control arm 39, a knuckle plate 40, a support strut 41, an air spring 42 and an associated shock absorber. Lower control arm 38 has a substantially triangular panel configuration and is universally connected at two corners thereof to transverse wall members 29 and 30 of the vehicle body. Such panel further is dished both longitudinally and transversely so as to prevent ground matter from being thrown up onto the operating components of the unit, and further to facilitate the travel of the vehicle when the wheels become sunk in soft soil, mud, sand or water. Upper control arm 39 has a V-shaped configuration including a pair of arm sections 44 and 45 pivotally connected at their inner ends thereof to the transverse wall members of the vehicle hull as at 44a and 45a.

Referring to FIGS. 1 through 9, there is disposed within rim portion 35 of the wheel, an axle end assembly including knuckle plate 40, a roller bearing 50, a hub 51 and a retainer housing 52. Knuckle plate 40 has a substantially annular configuration including diametrically opposed projecting portions 53 and 54 and a knuckle bracket 55. Upper protruding portion 53 is universally connected to a mounting bracket 56 by means of a ball joint connection 57, which in turn is pivotally connected to a pair of spaced arm portions of the upper control arm by means of a set of pins having a centerline passing through the center of ball joint connection 57. Lower protruding portion 54 is universally connected to the outer end of lower control arm 38 by means of a ball joint connection 62. Ball joint connections 57 and 62 define a kingpin axis 63, at least the lower end of which is disposed within rim portion 35 of the wheel. Knuckle bracket 55 also is universally connected to the outer end of a tie rod 64. In the conventional manner, knuckle plate 40 will be caused to displace vertically relative to the body of the vehicle as the upper and lower control arms pivot about horizontal axes, and will swivel about the kingpin axis as tie rod 64 is displaced inwardly and outwardly. The inclination of the kingpin axis is at an angle in the range of 7° to 9° relative to the vertical.

Hub 51 has an annular configuration including a protruding annular portion 70. Roller bearing 50 includes an inner race 71, and outer race 73 and a set of crossed cylindrical rollers 74. The inner race receives hub portion 70 therein and is secured to the hub by means of a set of bolts 72. The outer race of the bearing is caused to be fixed to the knuckle plate and the inner race of the bearing secured to the hub is free to rotate with the hub, by means of retainer housing 52 which encompasses the bearing and hub and is secured to the knuckle plate by means of a set of bolts 75 to clamp the outer race of the bearing between the knuckle plate and the retainer housing. Disc portion 36 of wheel 34 is coaxially mounted on hub 51 by means of a set of studs 76.

Figure 3:
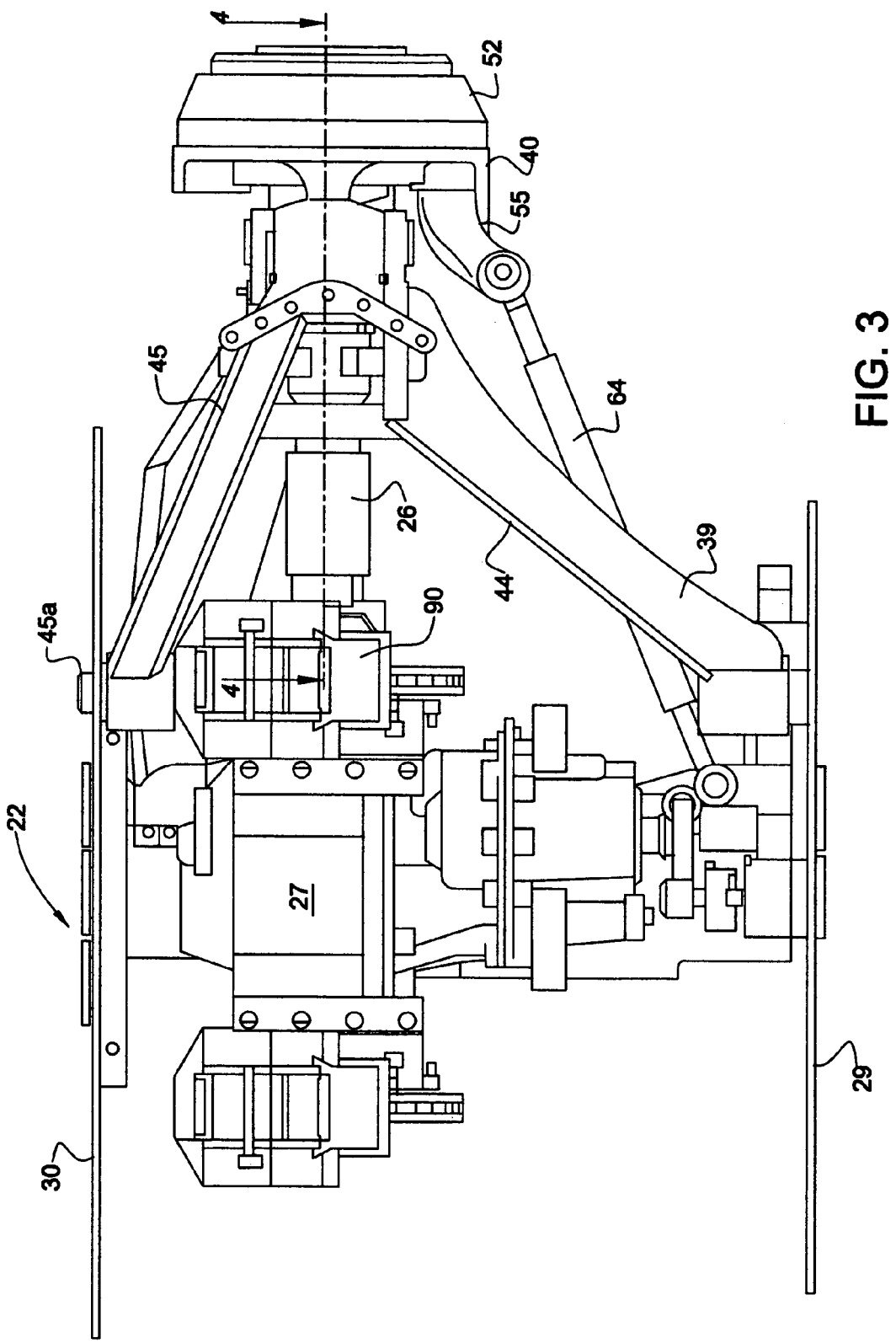
FIG. 3 is a top plan view of a portion of the wheel unit shown in FIGS. 1 and 2.
Figure 4:
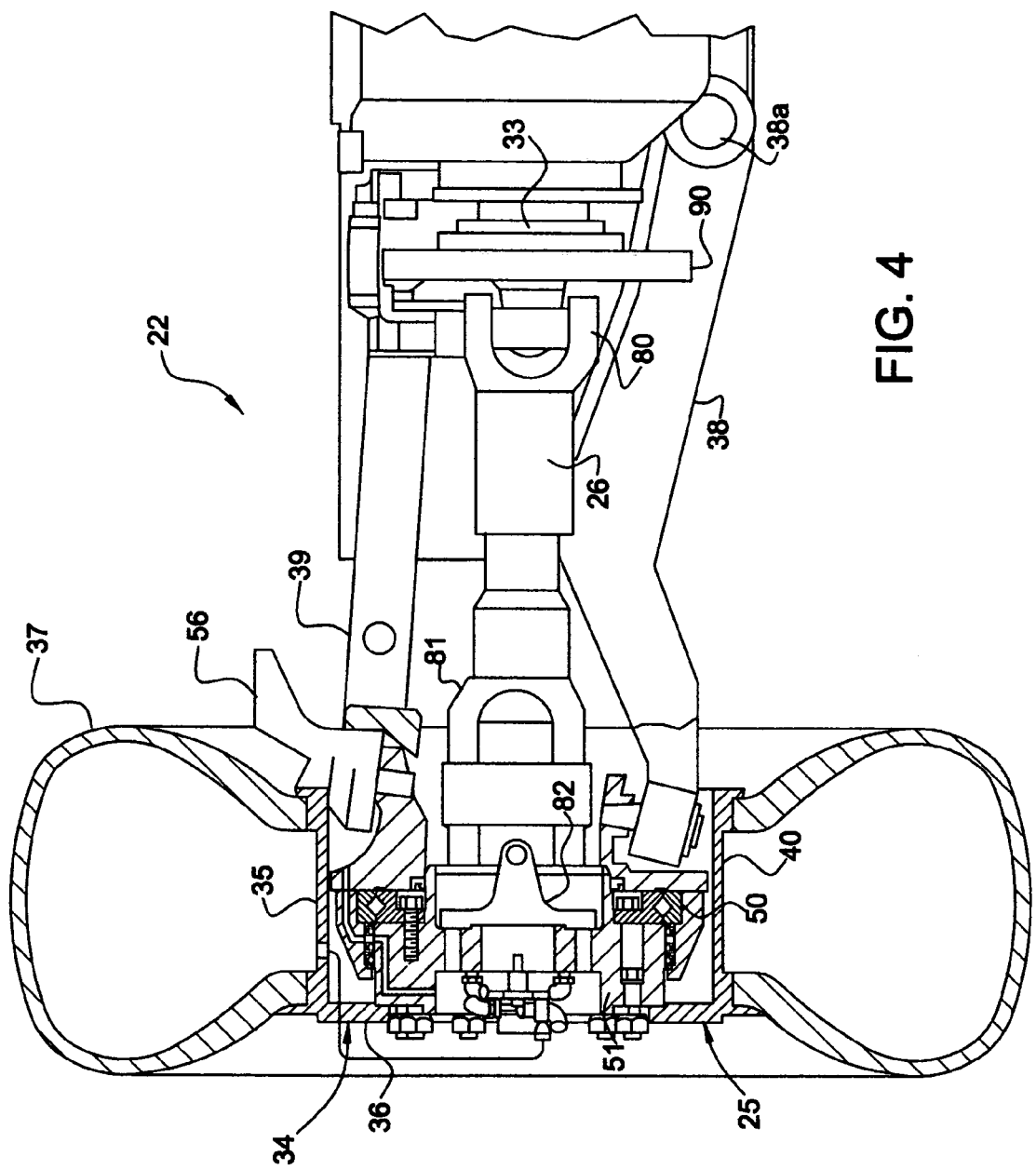
FIG. 4 is an enlarged, vertical cross-sectional view taken along line 4-4 in FIG. 3, having a tire mounted thereon.
Figure 5:
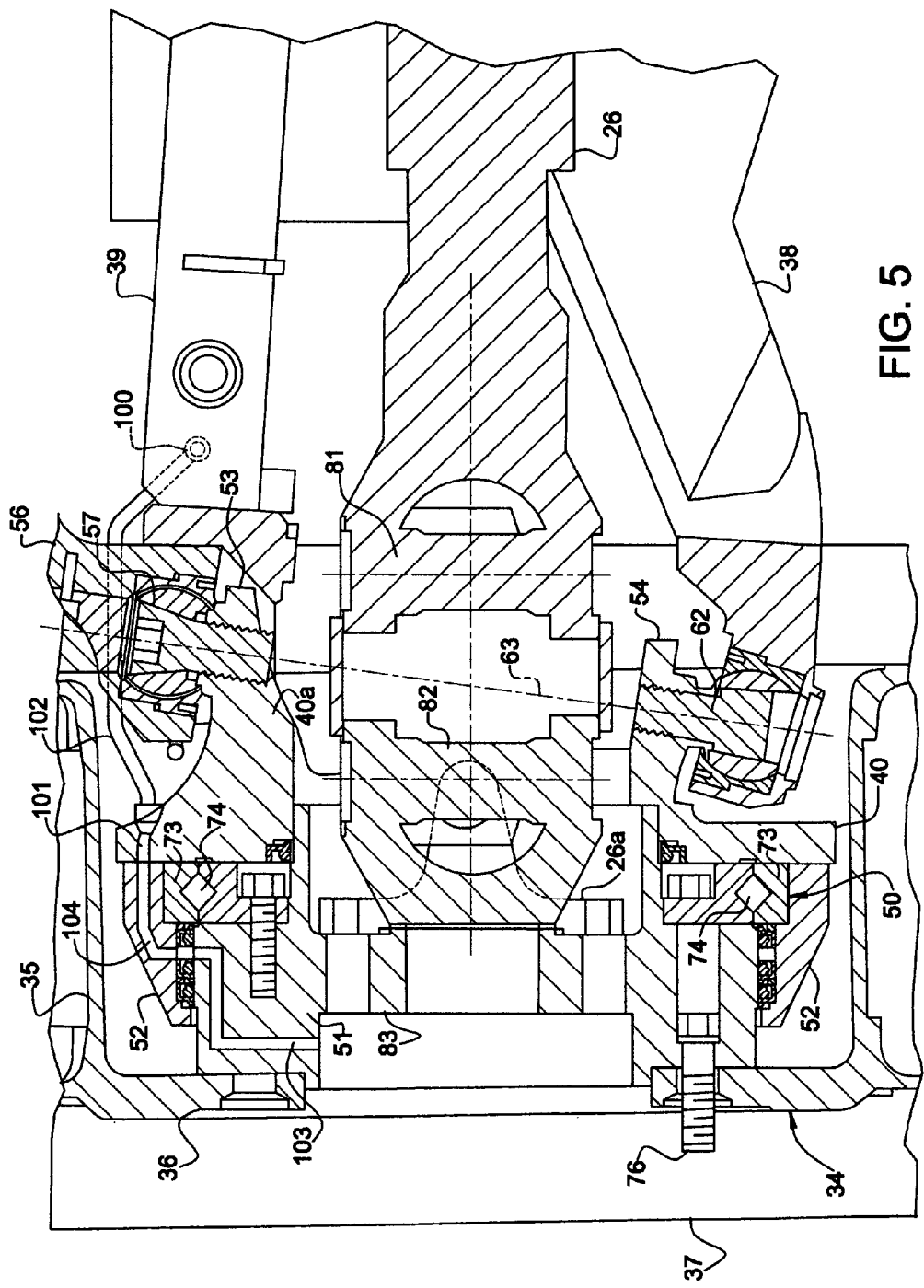
FIG. 5 is an enlarged, vertical cross-sectional view of the connection of a half axle to the wheel of the unit.

Referring to FIGS. 3 through 5, half shaft 26 drivingly interconnects stub shaft 33 and hub 51. It is connected at an inner end thereof to output shaft 33 by means of a universal connection or Cardan joint 80 or a pair of Cardan joints and is provided with a pair of Cardan joints 81 and 82 adjacent the outer end thereof. Such outer end of the shaft is received through opening 40a of the knuckle plate and annular portion 70 of hub 51, and secured coaxially to the hub. The outer end of half shaft 26 is provided with an annular flange 26a which is bolted to an annular portion 83 of the hub. In such arrangement, drive is transmitted from output shaft 33 through half shaft 26 and hub 51 to wheel 34. Braking of the wheel is provided by a disc brake 90 mounted inboard on carrier 27 and operatively connected to output shaft 33. Mounting the disc brakes inwardly adjacent the carrier not only lessens upsprung mass at the wheel but results in less congestion at the wheel and facilitates access to the brake for repair and replacement without the need to remove the wheel.

The components of the axle end assembly consisting of the knuckle plate, the hub, the bearing with the outer race thereof fixed to the knuckle plate and the inner race thereof fixed to the hub and the retainer housing fixed to the knuckle plate, clamping the outer race of the bearing against the knuckle plate and encompassing the hub and bearing, are coaxially disposed and confined within the rim portion of the wheel. In addition, the kingpin axis intersects the midpoint of Cardan joints 81 and 82, and at least a lower portion of the kingpin axis also is disposed within the rim portion of the wheel. With such arrangement, the half shaft is free to displace vertically and angularly about the kingpin axis to permit the vehicle to traverse irregular and sloped terrain and steer while transmitting drive and braking to the wheel.

The roller bearing functions to carry axial, radial and moment loads. In the embodiments shown in FIGS. 4 through 8, the bearings are provided with raceways in the inner and outer races thereof which are inclined at an angle of 45° relative to the axis of the bearing, between which the cylindrical rollers are arranged alternately at 90° to each other. The diameter of the rollers is larger than their length. Such bearing is functional to accommodate radial and axial loads acting in both directions, and also tilting moments.

Alternatively to the axle end assembly shown in FIG. 7 utilizing a crossed cylindrical roller bearing, an assembly as shown in FIG. 7a may be used utilizing a pair of tapered bearings. Such assembly includes a knuckle plate 40' comparable to knuckle plate 40, a hub 51a comparable to hub 51, having an annular portion 70a receivable within the opening in the knuckle plate, a pair of tapered roller bearings 50a and 50b separated by a spacer 50c and having the inner races thereof mounted on an annular outer surface of the hub with the inner race of bearing 50a engaging a shoulder provided on the hub, and an annular retainer housing 52a encompassing hub 51a and bearings 50a and 50b, engaging the outer race of bearing 50a and secured to knuckle plate 40' by means of a set of bolts. The clamping action of retainer housing 52a functions to maintain the outer races of bearings 50a and 50b fixed to the knuckle plate while permitting the inner races thereof to rotate with the hub. The inner races of bearings 50*a* and 50*b* are secured to hub 51*a* by a nut 51*b*. As in the assembly shown in FIG. 7, the outer end of a half shaft 26*a* is disposed coaxially with and secured to hub 51*a* by means of a set of bolts. In operation, the assembly shown in FIG. 7*a* functions in the same manner as the assembly shown in FIG. 7 with the knuckle plate being free to displace vertically and swivel about the kingpin axis, and the half shaft transmitting drive through hub 51*a* to a wheel mounted thereon in the manner as previously described.

Figure 9:
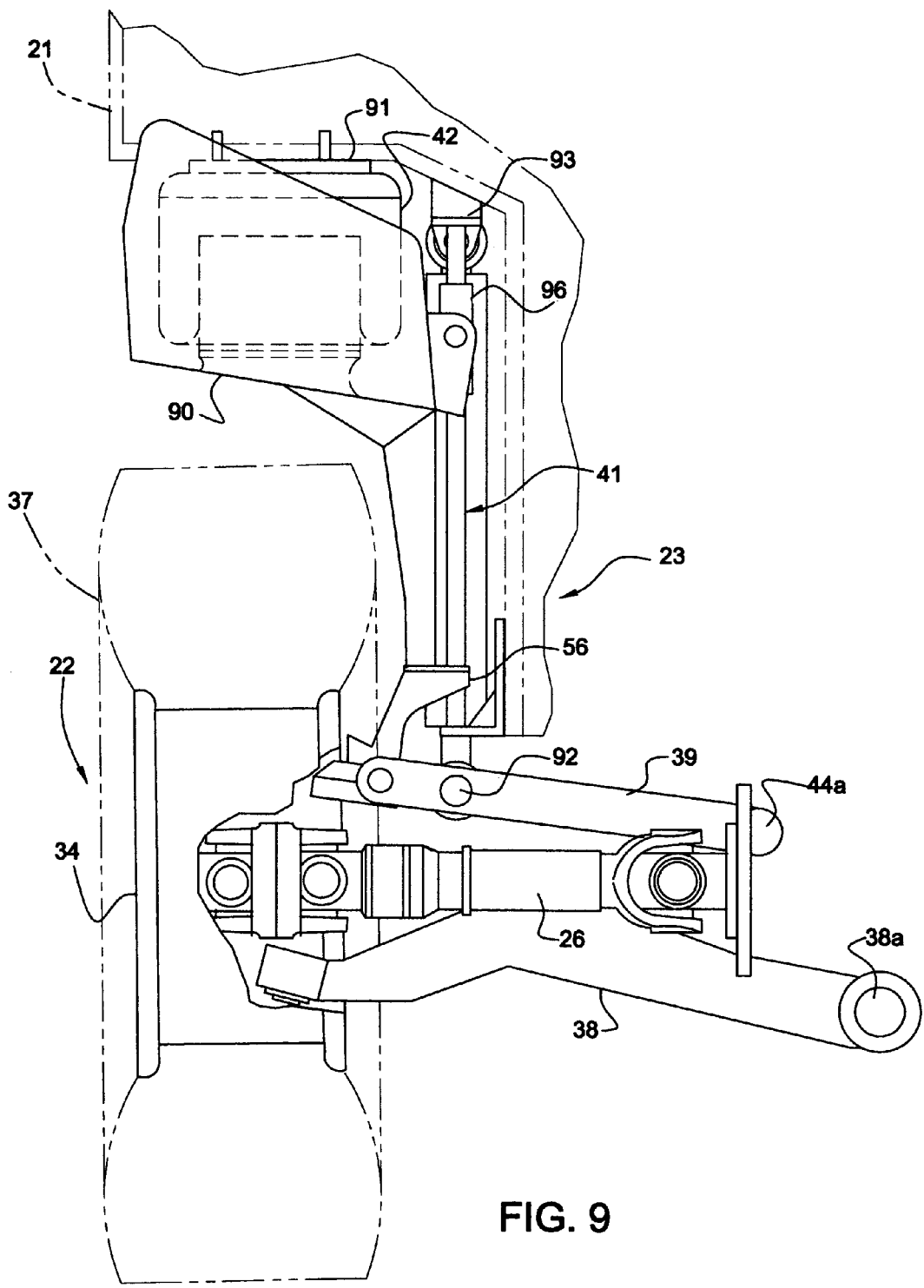
FIG. 9 is a side elevational view of the wheel unit including components of the suspension system.

As best seen in FIG. 9, support strut 41 is rigidly connected at the lower end thereof to mounting bracket 56 and is provided at an upper end thereof with a laterally projecting support ledge section 90 on which air spring 42 is seated and rigidly attached. The air spring is of a conventional construction and includes an upper plate member 91 which is bolted, welded or otherwise rigidly secured to the underside of the vehicle body within the wheel well. The shock absorber also is of a conventional construction, pivotally connected at a lower end thereof to a connecting pin 92 in the upper control arm and pivotally connected at an upper end thereof to a bracket 93 rigidly secured to the underside of the vehicle body within the wheel well. Also connected at their upper ends to attachment plate 93 is a set of rods disposed parallel to the piston portion of the shock absorber and guided in a set of bushings supported on support strut 41. To protect the air spring, support ledge 90 is provided with a curved guard having a sufficient height to completely shield the air spring when the air spring is in an onroad condition as shown in FIG. 9.

To assemble the wheel unit as described, with the body of the vehicle sufficiently elevated, the inner ends of the upper and lower control arms are first connected to the vehicle and the half shaft is connected to the output shaft of the carrier. With mounting bracket 56 mounted on the upper control arm, support strut 41 with air spring 42 mounted thereon is inserted in the wheel well, the lower end of the support strut is bolted to mounting bracket 56 and upper plate 91 of the air spring is bolted to the vehicle. The shock absorber is then connected between the upper control arm and the underside of the vehicle within the wheel well. Knuckle plate 40 is then inserted into the wheel well and connected to the upper and lower control arms, allowing the free end of the half shaft to be received through the opening in the knuckle plate. Roller bearing 15 is then mounted on hub 51 and hub 51 with bearing 50 mounted thereon is placed within the wheel well and mounted in the knuckle plate. The hub and bearing thus installed are secured in position by mounting the retainer housing and securing it to the knuckle plate so that the outer race of the bearing will be interposed between the retainer housing and the knuckle plate and the inner race of the bearing will be secured to the hub for rotation therewith. The outer end of the half shaft then is secured to the hub by bolting end flange 26*a* to annular hub portion 83. Wheel 34 may then be positioned coaxially against the exposed end of hub 51 and secured thereto by means of a set of bolts 76. Assuming the wheel unit is a steerable unit, the installation of the unit would be completed by connecting the knuckle bracket of the knuckle plate to tie rod 64 of the steering system of the vehicle.

For traversing different terrain and also for operating the vehicle on soft ground, it often is desirable to be able to vary the amount of inflation of the tires of the vehicle. For this purpose, a fluid passageway is provided intercommunicating a source of air under pressure on the body of the vehicle and each of the tires of the vehicle. With respect to the wheel unit described, such passageway includes a passageway in upper control arm 39 communicating with a fixture 100 mounted on the outer, upper end of the upper control arm, a passageway 101 in knuckle plate 40, a hose 102 intercommunicating fixture 100 and passageway 101, an annular groove and a passageway 103 in hub 51, a passageway 104 intercommunicating passageways 101 and 103, a valve 105 (FIG. 9) communicating with passageway 103, and a hose intercommunicating valve 105 and a port in the rim portion of the wheel communicating with the interior of the tire. Valve 105 is of a type that may be actuated to open or close by transmitting bursts of air through the passageway as described. Suitable controls are provided in such passageway to supply air under pressure to inflate such tires and to vent such passageway to deflate the tire. Because of their positioning, such passageways can be larger than comparable passageways in prior art vehicles and thus are capable of providing larger volumes of air for faster reaction times.

By supporting the wheel on the half shaft at a point further from the longitudinal centerline of the vehicle than conventionally mounted wheels on axle spindles, greater vertical displacement of the wheel is achieved without greatly increasing the angularity of the half shaft. Accordingly, increased wheel travel is provided without the half shaft unduly intruding upon the hull of the vehicle and correspondingly diminishing the compartment space within the vehicle. Such arrangement further provides less intrusion of the wheels into the hull when the wheels are turned when steering. Typically, the wheels will swivel in an arc of about 26°.

Figure 10:
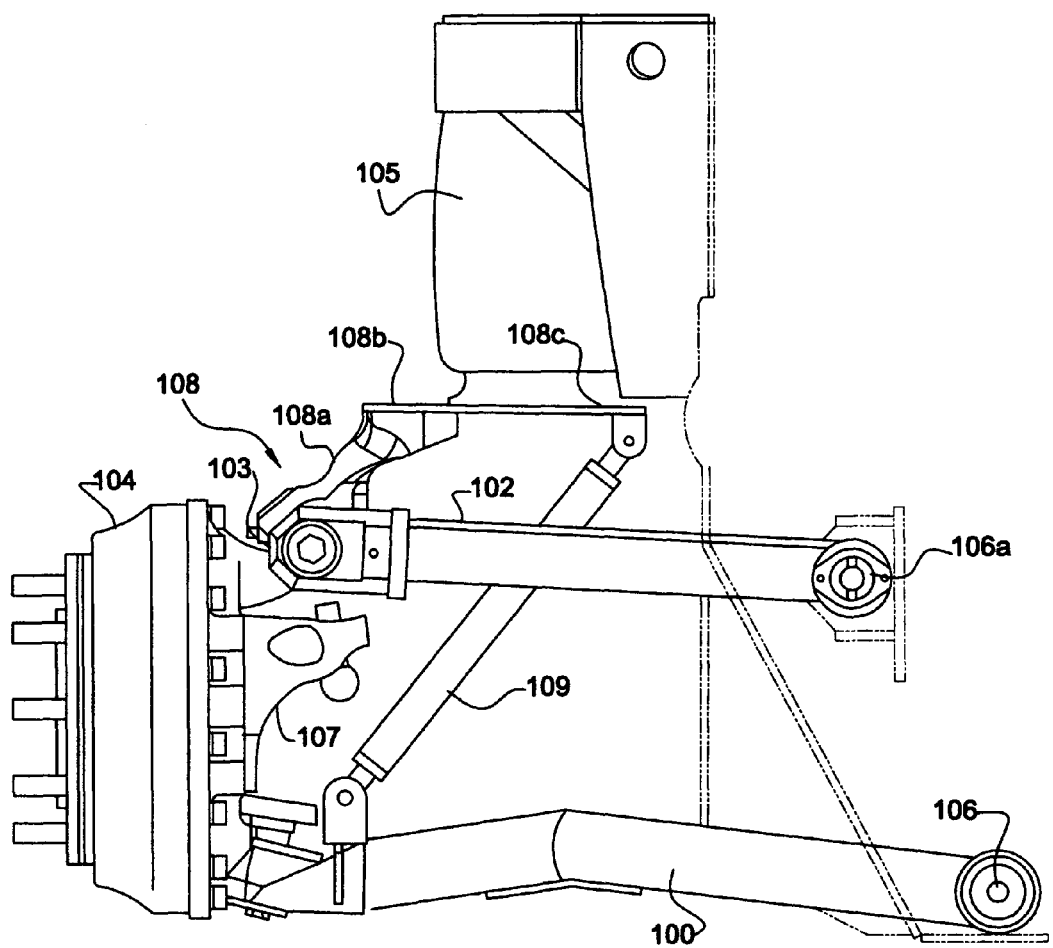
FIG. 10 is a side elevational view of another embodiment of the invention.
Figure 11:
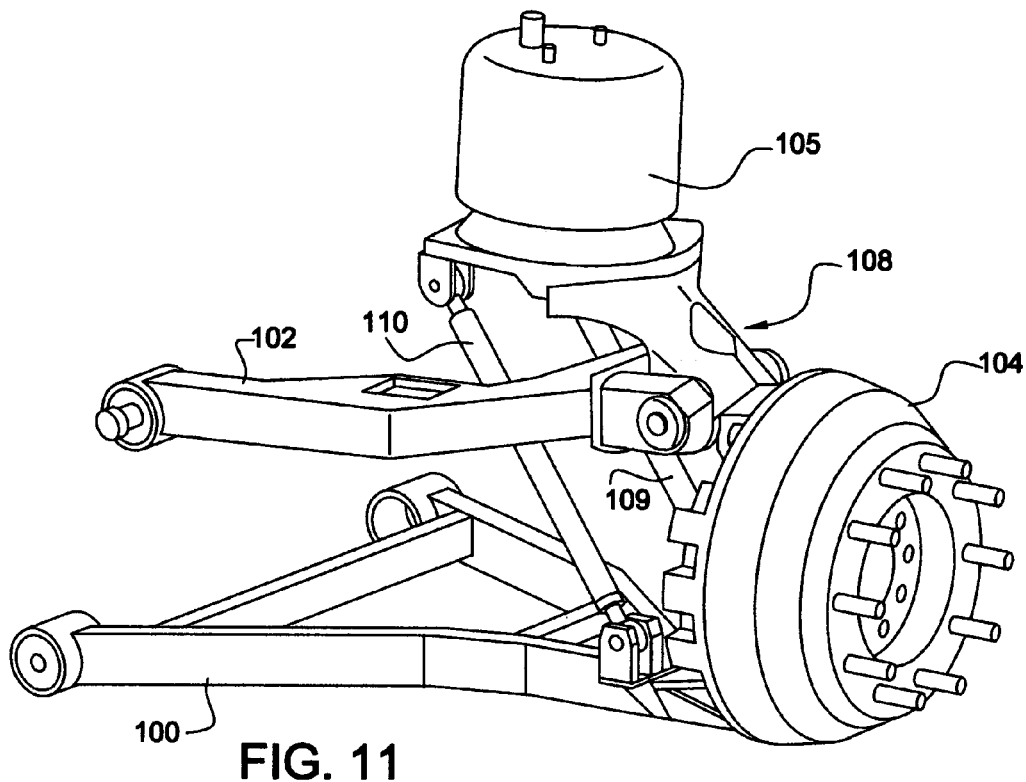
FIG. 11 is a perspective view of the embodiment shown in FIG. 10, viewed from an exterior vantage point.
Figure 12:
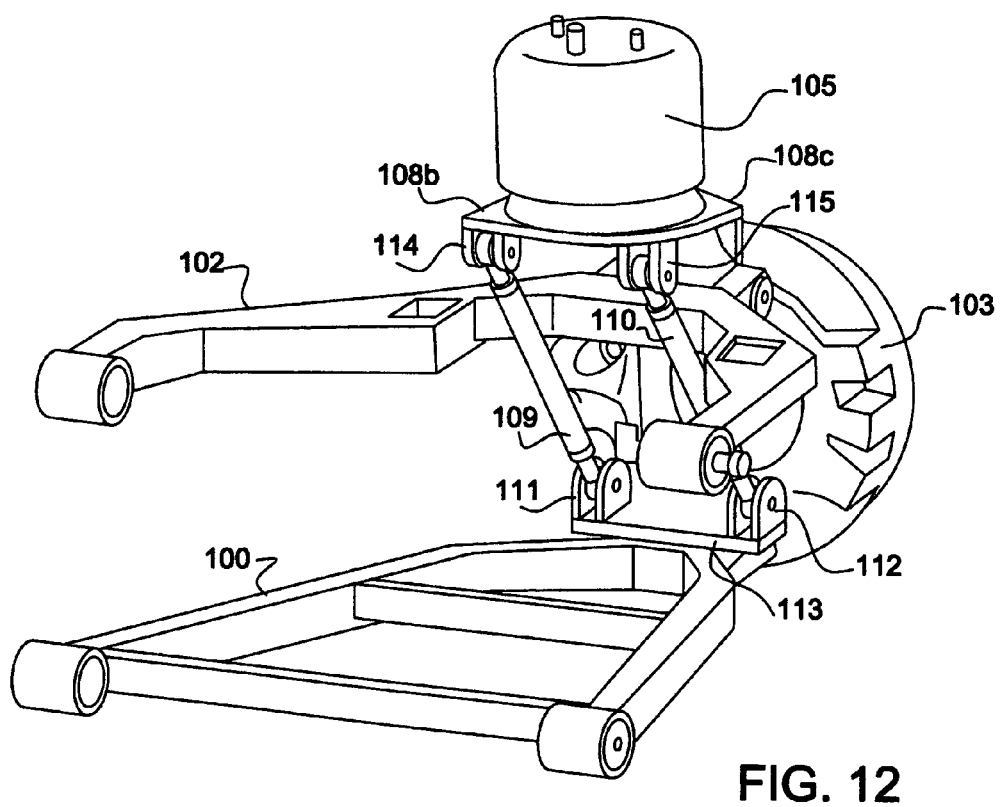
FIG. 12 is a perspective view of the embodiment shown in FIG. 10, viewed from an interior vantage point.

Referring to FIGS. 10 through 12, there is illustrated another embodiment of the invention which is similar to the previously described embodiments except for the mounting of the air spring for the suspension system. The embodiment consists of an assembly including a lower control arm 100, an upper control arm 102, a knuckle plate 103, a hub 104 and an air spring 105. Lower control arm 100 is comparable to previously described lower control arm 38 and is pivotally connected at an inner end thereof to the vehicle body as at 106 and is universally connected at an outer end thereof to lower end of knuckle plate 103. Upper control arm 102 is comparable to upper control arm 39 and is pivotally connected at a rear end thereof to the vehicle body as at 106*a* and universally connected at an outer end thereof to an upper end of the knuckle plate. As in the previously described embodiment, knuckle plate 103 is secured to the outer race of a roller bearing housed within hub 104, and hub 104 is secured to the inner race of such bearing. The knuckle plate has a center opening through which the outer end of a half axle comparable to half axle 26, extends and connects to the hub. The outer side of hub 104 is connected to the disc portion of a wheel rim by a set of bolts so that the hub and knuckle plate are disposed within the wheel rim. The outer end of the half shaft is connected to the hub through one or a pair of Cardan or universal joints. The steering axis of the assembly similarly intersects the center of the single or pair of universal joints, having the lower end thereof received within the wheel rim. The hub portion of the assembly is pivoted about the steering axis by means of a knuckle 107 connected to a tie rod in the conventional manner. As in the previous embodiment, the upper and lower control arms adapted to pivot about their axes to provide vertical motion of the wheel and the tie rod operates to transmit motion to the knuckle plate to pivot and thus steer the wheel about the steering axis.

Pivotally connected to the outer end of upper control arm 102 is a strut or mounting bracket 108 including a lower, inwardly and upwardly projecting base portion 108*a* and an upper platform portion 108*b* providing a seating surface 108c. The axis of the pivotal connection of the base portion of strut 108 to the upper control arm is disposed substantially parallel to the axes of pivotal connections 106 and 106a and may either intersect the universal connection of the upper control arm with the knuckle plate or be offset relative thereto. Interconnecting the outer end of the lower control arm and the inner end of platform portion 108b is a pair of longitudinally spaced links 109 and 110 as best seen in FIG. 12. The lower ends of links 109 and 110 are pivotally connected to sets of ear portions 111 and 112 provided on a bracket 113 secured to the lower control arm, and the upper ends thereof are pivotally connected to a pair of ear portions depending from the inner end of platform portion 108c.

Air spring 105 is seated on surface 108c and rigidly secured to platform portion 108b. The upper end of the air spring is secured to the body of the vehicle in the conventional manner. A shield 116 is provided for partially shielding the air spring.

As the wheel displaces vertically between full jounce and rebound positions, such motions are transmitted to the air spring through strut 108 and links 109 and 110 to cause the spring to extend and retract in the conventional manner to absorb the forces generated. The geometry of the components of the system are selected so that seating surface 108c of platform portion 108b will be substantially horizontal when the wheel assembly is in the full jounce condition, approximately three degrees below the horizontal when the assembly is in the highway running condition and approximately one degree above the horizontal when the assembly is in the full rebound position. Generally, seating surface 108c will displace angularly through an arc of no greater than four degrees.

The embodiment as shown in FIGS. 10 through 12 particularly is suitable where it is desirable or necessary to position the air spring further inboard and where compartment space is less critical.

The platform of the vehicle in which any of the described wheel assemblies may be installed, may consist of a conventional truck including a main frame, a cab mounted on the front end thereof and a body mounted on the frame behind the cab. The platform further may consist of a main frame and a cab and a flat bed mounted on the frame with or without a variety of implements mounted on the flat bed. In addition, although the invention has been described in connection with a platform consisting of a hull of monocoque construction having a specific design, such hull may consist of any suitable design.

From the foregoing detailed description, it will be evident that there are a number of changes, adaptations, and modifications of the present invention which come within the province of those persons having ordinary skill in the art to which the aforementioned invention pertains. However, it is intended that all such variations not departing from the spirit of the invention be considered as within the scope thereof as limited solely by the appended claims.

We claim:

1. A wheel suspension system for a vehicle having a body supported on a set of wheels each provided with a wheel rim and an axle, comprising:
    a lower control arm pivotally connectable at one end thereof directly to a first portion of said body;
    an upper control arm pivotally connectable at one end thereof directly to a second portion of said body;
    a roller bearing having inner and outer races, disposed within said rim, coaxially relative to the rotational axis of said rim;
    a knuckle plate mounted on the outer race of said bearing, having a first portion universally connected to said lower control arm and a second portion universally connected to said upper control arm, defining a steering axis intersecting said rotational axis;
    a hub member mounted on said inner race and connectable to said rim and an axle receivable through an opening provided in said knuckle plate;
    a unitary strut pivotally connected to said upper control arm, having a support portion;
    at least one unitary link having an end pivotally connected to said lower control arm and another end pivotally connected to said support portion; and
    a spring seated on said support portion, having an upper end connectable to a portion of said vehicle body.

2. A system according to claim 1 wherein said strut projects inwardly and upwardly and a spring seating surface of said support portion is disposed substantially horizontally under full jounce conditions.

3. A system according to claim 2 wherein said spring seating surface is disposed substantially three degrees below horizontal under highway running conditions.

4. A system according to claim 2 wherein said spring seating surface is disposed substantially one degree above horizontal under full rebound conditions.

5. A system according to claim 2 wherein the geometry of the linked components thereof is selected to provide an angular displacement of said spring seating surface not exceeding four degrees during all operating conditions of said system.

6. A system according to claim 1 wherein said bearing is provided with a set of cylindrical rollers.

7. A system according to claim 6 wherein said bearing is provided with raceways in inner and outer annular portions thereof which are inclined at an angle of 45° relative to the axis of said bearing, between which said cylindrical rollers are alternately oriented 90° relative to each other.

8. A system according to claim 1 wherein said knuckle plate is provided with an arm operatively connectable to a steering system provided on said body.

9. A system according to claim 1 wherein at least a portion of said steering axis is disposed within said rim.

10. A system according to claim 1 wherein said steering axis is inclined at an angle in the range of 7° to 9° relative to the vertical.

11. A system according to claim 1 wherein the connections of said knuckle plate to said upper and lower control arms comprise ball joint connections and wherein said steering axis intersects the centers of the ball portions thereof.

12. A system according to claim 1 wherein said upper control arm and said knuckle plate include a passageway intercommunicating a source of a pressure disposed on said body and a passageway disposed in said rim communicable with a tire mounted on said rim.

13. A system according to claim 1 including a shock absorber cooperable with said spring.

14. A system according to claim 1 wherein the axis of the pivotal connection of said strut to said upper control arm intersects the center of the universal connection of said upper control arm to said knuckle plate.

15. A system according to claim 1 wherein the axis of the pivotal connection of said strut to said upper control arm does not intersect the center of the universal connection of the upper control arm to the knuckle plate.

16. A system according to claim 1 including a pair of longitudinally spaced, parallel links having one set of ends pivotally connected to said lower control arm and another set of ends pivotally connected to said support portion of said strut.

17. A wheel suspension system for a vehicle having a body supported on a set of wheels each provided with a wheel rim and a axle, comprising:
- a lower control arm pivotally connectable to a first portion of said body;
- a upper control arm pivotally connectable to a second portion of said body;
- a roller bearing having inner and outer races, disposed within said rim, coaxially relative to the rotational axis of said rim;
- a knuckle plate mounted on the outer race of said bearing, having a first portion universally connected to said lower control arm and a second portion universally connected to said upper control arm, defining a steering axis intersecting said rotational axis;
- a hub member mounted on said inner race and connectable to said rim and an axle receivable through an opening provided in said knuckle plate;
- a strut pivotally connected to said upper control arm, having a support portion;
- at least one unitary link having an end pivotally connected to said upper control arm and another end pivotally connected to said support portion; and
- a spring seated on said support portion, having an upper end connectable to a portion of said vehicle.

18. A system according to claim 17 including a shock absorber operatively interconnecting said upper control arm and a portion of said body.

* * * * *